May 25, 1971  D. R. THOMPSON  3,579,702
SWEEPER

Filed July 22, 1969  3 Sheets-Sheet 1

INVENTOR.
David R. Thompson
BY
Van Valkenburgh & Lowe
BY  ATTORNEYS

May 25, 1971  D. R. THOMPSON  3,579,702
SWEEPER
Filed July 22, 1969  3 Sheets-Sheet 2
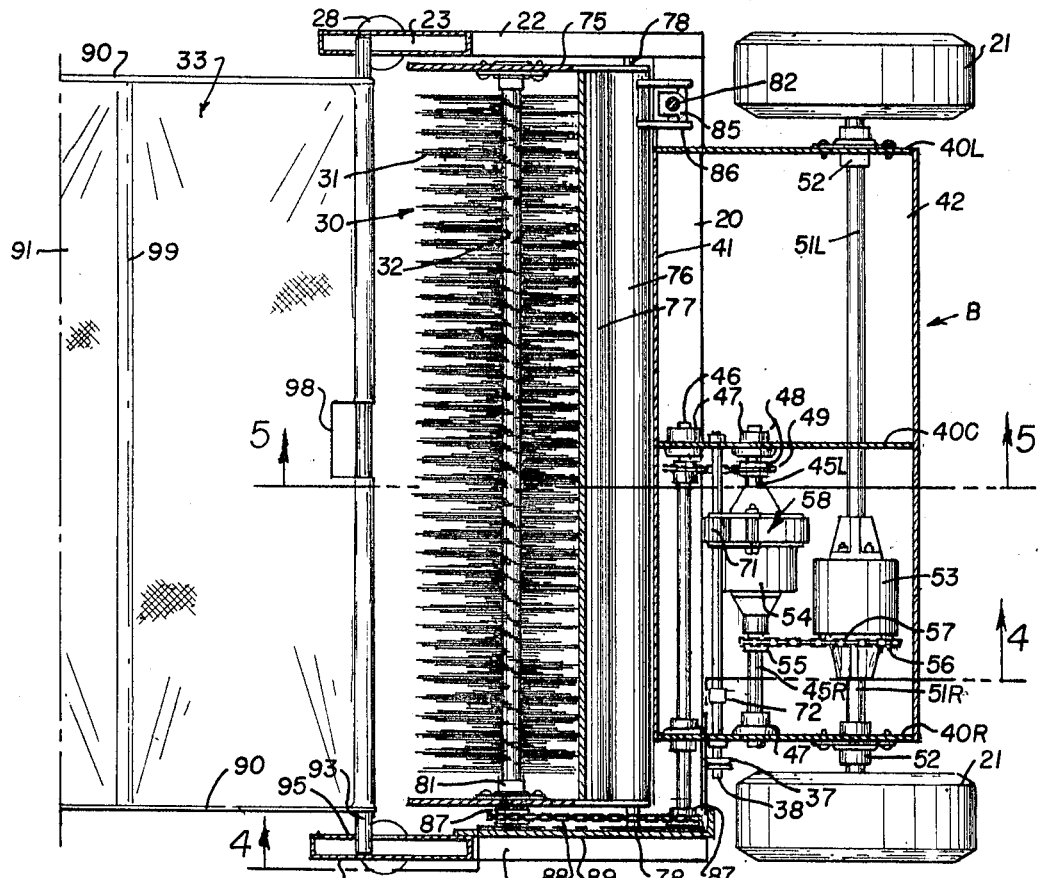
Fig. 3
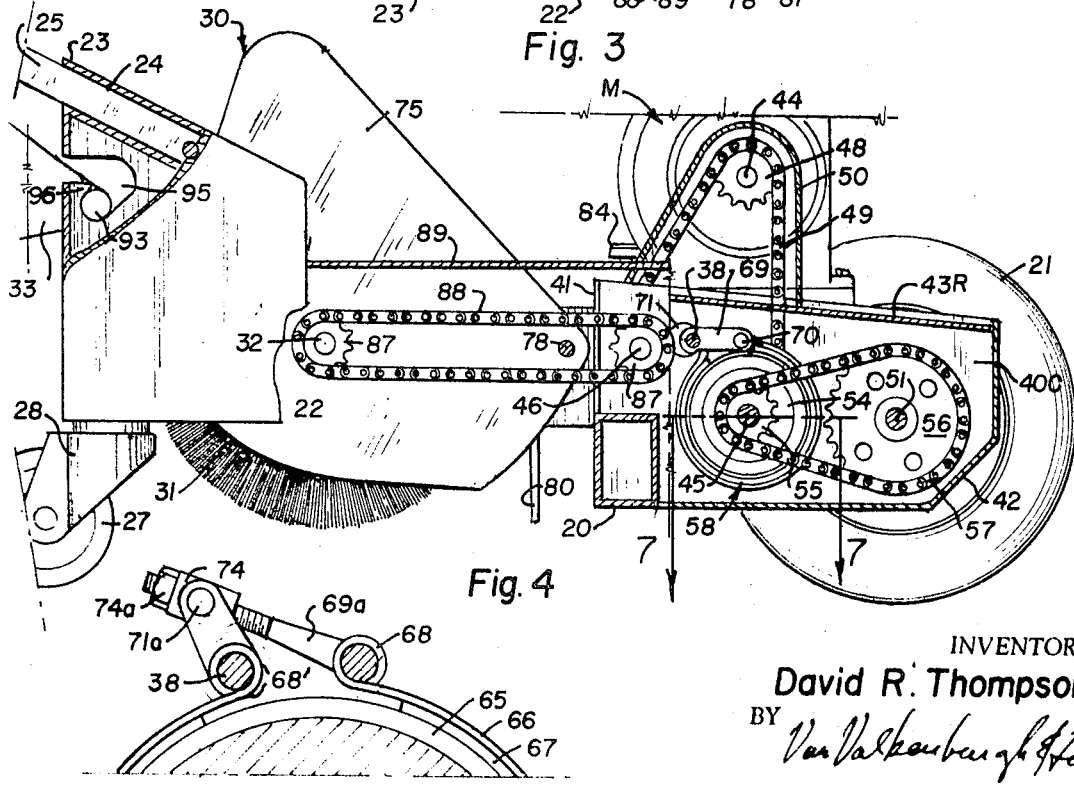
Fig. 4
Fig. 11
INVENTOR.
David R. Thompson
BY Van Valkenburgh & Lowe
ATTORNEYS

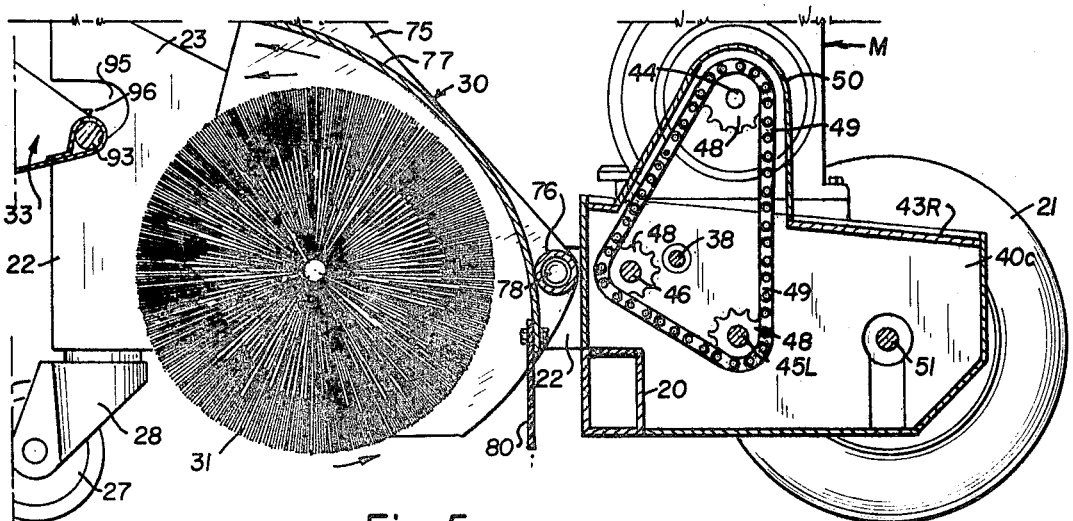
Fig. 5
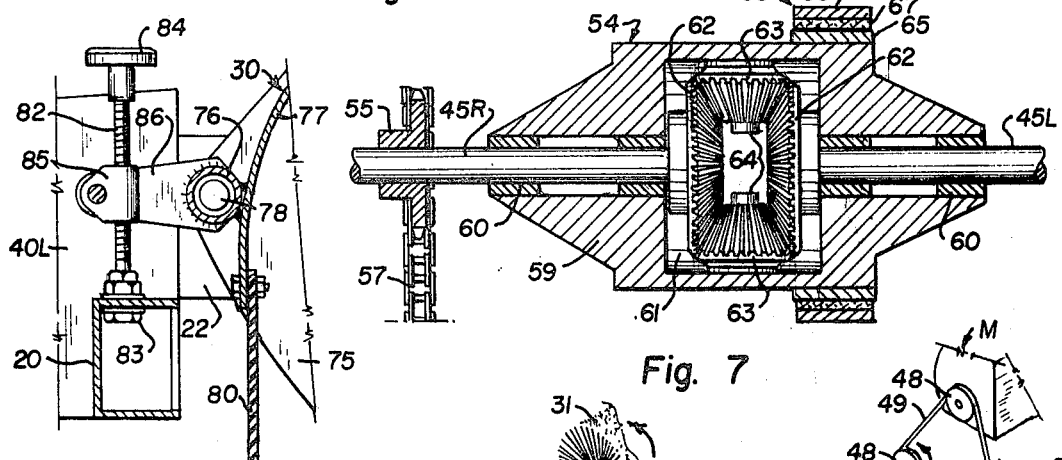
Fig. 6
Fig. 7
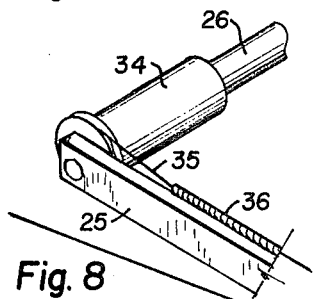
Fig. 8
Fig. 10
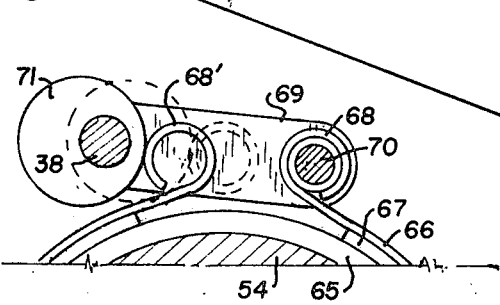
Fig. 9
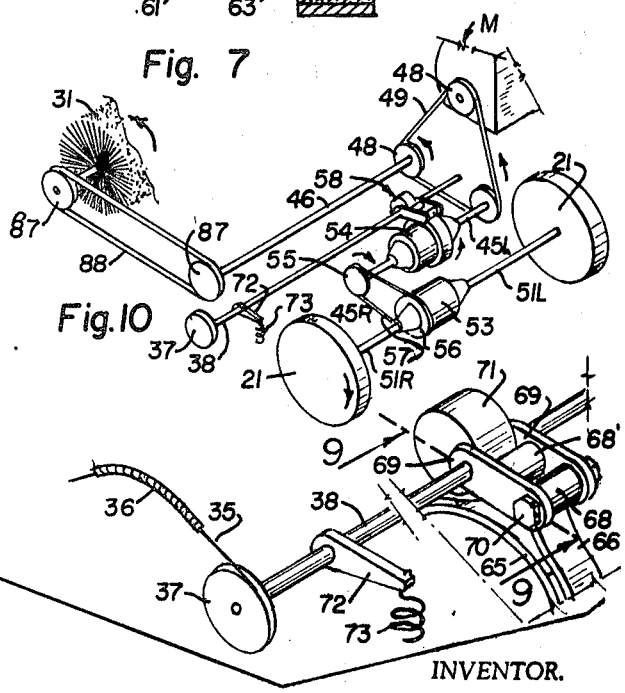
INVENTOR.
David R. Thompson
BY Van Valkenburgh & Lowe
ATTORNEYS … # 3,579,702
SWEEPER
David R. Thompson, Denver, Colo., assignor to Rental Equipment Manufacturing Corporation, Denver, Colo.
Filed July 22, 1969, Ser. No. 843,608
Int. Cl. E01h 1/04
U.S. Cl. 15—79     8 Claims

ABSTRACT OF THE DISCLOSURE

A self-propelled, wheel mounted sweeper carrying an engine to drive the unit; a sweeper brush adapted to be rotated to pick up debris on a lawn, ground surface or the like with the brush being directly connected to the engine to rotate it at a fixed speed with respect to the speed of rotation of the engine. This sweeper unit includes a pair of drive wheels mounted upon a shaft and operatively connected to the engine to propel the unit. This connection to the engine is through a differential carried upon a drive shaft connected to the engine and a driving shaft connected to the drive wheels. The differential is free to rotate upon these shafts and when being so rotated by the driven shaft, it does not apply any driving torque to the driving shaft. A brake is provided to reduce the rate of rotation of this differential or to stop its rotation completely and in either case, impart driving torque to the driving shaft. The driving shaft rotates in a direction opposite to the driven shaft when so restrained by the brake. This action is advantageously used to permit the drive wheels to rotate in a forward direction to propel the sweeper, while at the same time the engine and the sweeper brush rotate in the opposite direction to effect an overthrow of debris into a basket carried behind the sweeper.

---

This invention relates to sweepers and more particularly to self-propelled sweepers of the type which are commonly used for picking up lawn cuttings, leaves and the like from a lawn or yard. As such, the invention will be hereinafter called a sweeper.

The ordinary sweeper consists of a short, wheel-mounted body having a handle extending rearwardly and upwardly from the body so an operator may push the sweeper across a lawn or yard. The sweeper body carries a cylindrical brush arranged to rotate to throw debris such as lawn cuttings and leaves into a basket carried by the sweeper, usually behind the body and beneath the handle. The present invention concerns such a sweeper which is powered by an engine to rotate the brush and also to propel the unit with the operator following to control its movement.

A primary object of the present invention is to provide, in a motorized lawn sweeper, a novel and improved arrangement of a power drive at the wheels of the sweeper adapted to move the sweeper at a walking rate and thus assist an operator in guiding it across a lawn or yard.

Another object of the invention is to provide a novel and improved powered driving system for a sweeper which is capable of rotating the sweeping brush at a comparatively high rate of speed to efficiently pick up all sorts of debris from a lawn or other ground surface and at the same time rotating the drive wheels of the sweeper at a slower speed to permit the operator to walk behind the sweeper at an easy pace as it moves across a lawn or yard.

Another object of the invention is to provide, in a motorized sweeper, a novel and improved drive system which is capable of rotating the sweeper brush at a fixed rate established by the most efficient engine speed and sufficiently high so the brush will effectively pick up all sorts of debris from a lawn or yard and throw the same into a basket carried by the sweeper, and at the same time, capable of rotating the driving wheels at a slower rate and at variable rates to permit an operator to control the forward speed of the unit and especially, to move the same forwardly at slow speeds when it is sweeping up large amounts of debris.

Another object of the invention is to provide, in a motorized sweeper adapted to rotate a sweeper brush at a fixed rate, a novel and improved variable-speed drive system for moving the sweeper forwardly at varying rates of speed which will also easily slow down, make turns without slipping, and stop, all without affecting the rotation of the sweeper brush.

A further object of the invention is to provide, in a motor-driven, pusher-type sweeper, a simplified and improved transmission in the drive system which may be operated by simple, manual controls which, if released intentionally or accidentally, will cause the sweeper to stop its forward movement.

Other objects of the invention are to provide a novel and improved motor driven sweeper which is a neat-appearing, simple, compact, economical, rugged and durable unit and easily operated by anyone capable of operating a motorized lawn mower. As such, this sweeper is especially useful as a rental equipment item and for many types of commercial sweeping operations.

With the foregoing and other objects in view, my present invention comprises certain constructions, combinations and arrangements of parts ad elements as hereinafter described, defined in the appended claims, and illustrated in preferred embodiment by the accompanying drawing in which:

FIG. 3 is a sectional plan view as taken substantially from the indicated line 3—3 at FIG. 1, but on an enlarged scale.

FIG. 4 is a longitudinal section as taken from the indicated line 4—4 at FIG. 3, but on a further enlarged scale, and with plate portions being broken away to show parts otherwise hidden from view.

FIG. 5 is a longitudinal section as taken from the indicated line 5—5 at FIG. 3.

FIG. 6 is a fragmentary sectional detail of an adjustment screw as taken from the indicated line 6—6 at FIG. 2, but on an enlarged scale.

FIG. 7 is a fragmentary sectional detail of the transmission unit as taken from the indicated line 7—7 at FIG. 4, but on a further enlarged scale.

FIG. 8 is a fragmented isometric view of the several control members for the transmission unit.

FIG. 9 is a fragmentary sectional detail, as taken from the indicated line 9—9 at FIG. 8.

FIG. 10 is a diagrammatic isometric view of the driving system for the sweeper, with arrows indicating the respective direction of rotation of the several components.

FIG. 11 is a fragmentary, sectional detail similar to the arrangement shown at FIG. 9, but illustrating a modified form of the construction thereof.

Figure 1:
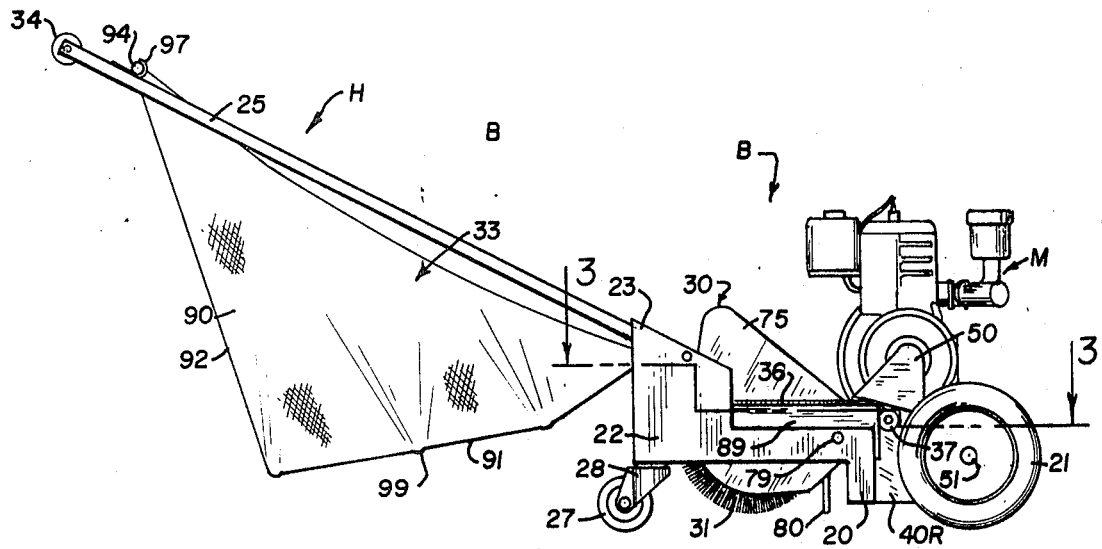
FIG. 1 is a side elevation view of the improved sweeper.

Referring more particularly to the drawing, the improved sweeper is a wheel mounted, motorized unit having a comparatively short, wide body B with a handle H extending rearwardly from this body so that an operator may push and guide the sweeper ahead of him as when moving it across a lawn or yard. In the following description, the components forming this sweeper will be described as being oriented longitudinally when they lie in the direction of movement of this sweeper or transversely when they are transverse to the direction of movement.

Figure 2:
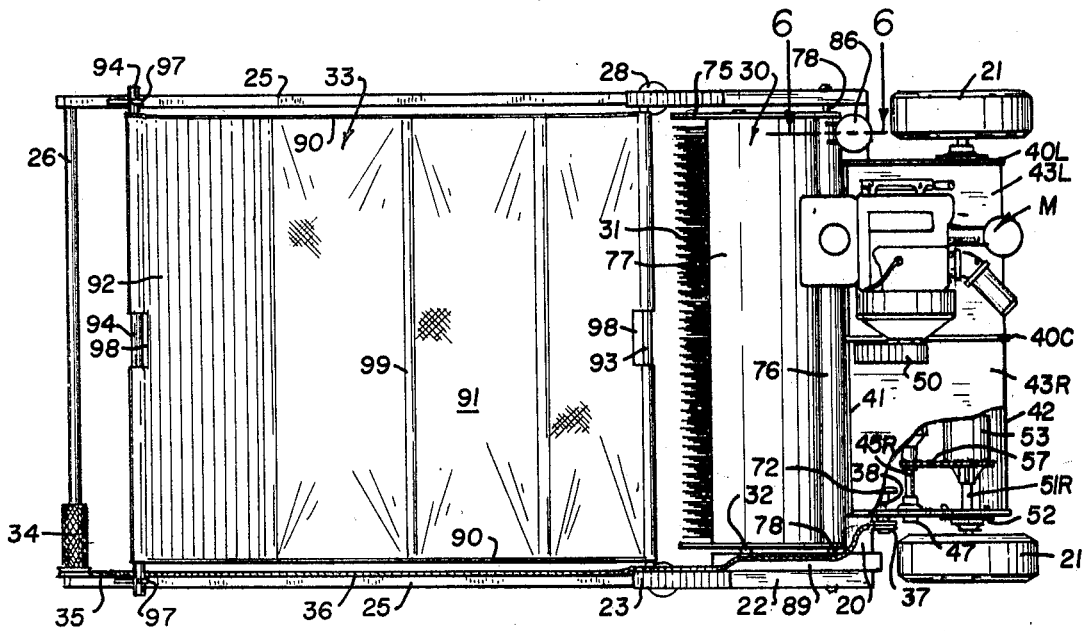
FIG. 2 is a top plan view of the sweeper shown at FIG. 1, but with a portion of a cover plate being removed to show parts otherwise hidden from view.

The body members of this sweeper, consisting of plates and beams, combine to form an integrated framework with the primary member being a transversely disposed beam 20 at the central portion of the body. Accordingly, the body may be described as having a forward section and a rear section. The forward section is formed as a box-like, compartmented structure extending forwardly from the center beam 20 as hereinafter described. This forward section is somewhat shorter, transversely, than the length of the beam to provide spaces for a pair of drive wheels, 21 each of which is mounted at a side of this forward section. The rearward section is formed as a pair of longitudinally disposed arms 22, each of which extends rearwardly from an end of the central beam 20, at one side of the body. Thus, the arms provide for an open, yokelike section at the rear of the unit. These rearwardly extending arms are projected upwardly at their rearward portion as at 23, and provide an inclined socket opening 24 at their top to hold rearwardly, and upwardly, extending side bars 25, of the handle H, as illustrated at FIG. 2. These bars, in turn, carry a transverse gripping bar 26 at their rearward ends. The wheels supporting this body include the drive wheels 21 at each side of the forward compartment and trailing wheels 27 supported upon caster swivels 28, each of which depends from the rearward end of an arm 22.

This framework carries the several operative components of the sweeper. An engine M, preferably a gasoline driven engine of any conventional type suitable for the purpose, is mounted upon the deck of the forward section of the frame while the drive system, which includes shafts, sprockets and differential controls as hereinafter described, is located within a compartment in the forward section. A transversely disposed sweeper hood 30, carrying a rotatable, cylindrical sweeper brush 31, is swingably mounted in the rearward yoke portion of the frame, that is, between the rearwardly extending arms 22. The shaft 32 of the sweeper brush, FIG. 3, is operatively connected to the drive system so the sweeper may rotate to pick up debris and throw the same rearwardly from the machine. To receive such debris, a basket 33 is suspended from the rearward end of each frame arm 22 and from each side bar 25 adjacent to the rear gripping bar 26.

The controls for this apparatus will include any suitable, conventional throttle means, not shown, to regulate the speed of the engine, and a transmission drive control to regulate the forward speed of the drive wheels regardless of the speed of the engine. The handle 34 of this drive control is located at one side of the gripping bar 26 and connects with a pull cord 35 which is housed in a sheath 36 mounted alongside a side bar 34 and upon an arm 22. This cord 35 extends from the sheath and connects with a control wheel 37 mounted on the outstanding end of a shaft 38 in the forward section as hereinafter further described.

The forward section of the body B, a box-like unit, is divided into a right hand and a left hand compartment by longitudinal ribs 40R and 40L at each side, and a rib 40C at the center of the section. These ribs extend forwardly from the beam 20 and from a transverse wall portion 41 upstanding from the beam. The front and underside of the compartments are closed by a cover plate 42 while the top of the section is closed by two deck plates 43R and 43L, one over each compartment.

In the illustrated embodiment, the engine M is mounted upon the deck plate 43L over the left side compartment. However, the drive shaft 44 of this engine overhangs the right side compartment to connect with a pair of transversely disposed, parallel transmission shafts within the right side compartment, a wheel drive transmission shaft 45L–45R and a brush drive transmission shaft 46. These two transmission shafts are carried in bearings 47 in the right, outer rib plate 40R and in the center rib plate 40C, the wheel drive transmission shaft 45L–45R being near the center of the right hand compartment and the brush drive transmission shaft 46 being near the rearward edge of the compartment. To effect the connection, the engine drive shaft 44 and the transmission shafts 45L and 46 carry sprockets 48 and are connected by a chain 49 as in the manner clearly illustrated at FIG. 5. To accommodate this chain, the deck plate 43R includes an opening adjacent to the central rib plate 40C and the chain and sprocket of the engine drive shaft, above the deck, are enclosed by a hood 50 upstanding from the deck plate.

The drive wheels 21 are mounted upon a transverse shaft 51L–51R which extends through openings in the ribs near the front end of the forward section and is held in position by bearings 52 in the outer rib plates 40L and 40R. The drive wheel shaft 51L–51R is divided into two portions which are interconnected by a differential 53. This differential, a conventional unit as hereinafter described, permits one wheel to rotate faster than the other when the sweeper is moving about a turn.

The wheel drive transmission shaft 45L–45R, which is adjacent to the wheel shaft 51L–51R, is likewise divided into two portions, a driven shaft 45L and a driving shaft 45R which are interconnected by a differential 54 similar to the differential 53. The driven section 45L is connected with the engine M, as above described. The driving section 45R connects with the wheel drive shaft differential 53 by a sprocket 55 on the shaft 45R, a sprocket 56 affixed to the differential 53 and with a chain 57 interconnecting the sprockets.

The differentials 53 and 54 are similar in construction, but the differential 54 is combined with a brake 58 to function as a transmission control as will be described. The differential 54, illustrated in section at FIG. 7, is formed as a cylindrical housing 59 with the two shaft sections 45L and 45R extending into bearings 60 in axially centered passageways at opposite sides of the housing. Each shaft section terminates within a compartment 61 within this housing and therein carries a bevel gear 62. The bevel gears 62 are, in turn, interconnected to complementary idle bevel gears 63 which are mounted upon radial shafts 64 secured to the transmission housing.

The structure of the differential 53 on shafts 51L and 51R may be substantially identical to that above described. The action of the differential 53, to permit one drive wheel to rotate ahead of the other, is well known and need not be described. However, the action of the differential 54 and the brake 58 to function as a transmission control is now described.

When the driven section 45L of the transmission shaft is being rotated by the engine M at a substantially constant rate, the rotation of the driving section 45R and the speed at which the drive wheels 21 move the sweeper will vary depending upon the manner in which the differential 54 is being held. When the brake 58 is released and the differential is free to rotate, the driving shaft 43R will not rotate if there is any load on this shaft and the sweeper will not move forwardly for no power can be transmitted through the differential. On the other hand, when the differential 54 is held stationary by the brake, the driving shaft 45R will rotate at the same rate as the rotation of the driven shaft 45L, but in the opposite direction. When the brake 48 is partly released to permit the housing 49 to rotate slowly, by slipping of the brake, the rate of rotation of the driving shaft 45R and the movement of the sweeper will be at a reduced speed. Thus adjustments of the brake will permit the sweeper to move forwardly at any desired speed, from a stop when the brake is released, to a maximum speed when the brake is fully set. It is to be noted that the engine drive shaft must be rotated in a direction opposite to the direction of the wheel shaft 51 and in the manner as indicated by the arrows at FIG. 10.

The brake 58 is used to hold the differential stationary or to allow it to rotate at various speeds. The differential 54 includes a cylindrical, axially centered brake cylinder 65 about its body 59. A brake band 66, of a conventional, commercially available type having conventional brake shoes 67 within it, embraces this cylinder and is attached by a suitable linkage to the shaft 38 of the drive control heretofore described, the attachment providing a means for tightening the brake band about the cylinder 65 responsive to rotation of this shaft 38. The brake band 66 is available with cylindrical heads 68 and 68' at its ends and the length of the band is such as to space these heads a short distance apart, approximately one inch, when the band is wrapped about the cylinder 65. These heads 68 and 68' are advantageously used in attaching a brake band to the shaft 38 as will now be explained.

The linkage attaching the brake band 66 to the shaft 38 to hold the brake band in position and to tighten it about the cylinder 65 responsive to rotation of the shaft 38 may be of several varying constructions. One preferred construction of an attachment is illustrated at FIG. 9. This attachment consists of a pair of shorts, flat links 69 each having a hole at each end. One end of each link is mounted upon the shaft 38 to extend therefrom in spaced parallelism with the other, and the extended end of each link is attached to one side of the brake band head 68, furthest from the shaft 38, by inserting a bolt 70 through the hole of one link, through the head 68 and thence through a hole in the end of the other link. The other brake band bead 68' lies between the connected head and the shaft 38 as clearly illustrated at FIGS. 8 and 9.

An eccentric cylinder 71 is affixed to the shaft 38 between the links 69 and is held at a normal position with the shorter side of the eccentric contacting the shiftable head 68' when the brake band is loose upon the cylinder 65 as illustrated at FIG. 9. However, rotation of the shaft 38 responsive to a pull of the cord 35 rotates the cylinder so that its long side pushes the heads together and locks the brake as in the manner indicated in broken lines at FIG. 9. It is contemplated that the normal position for this brake will be in its loose state where the housing 58 may rotate and where the driving shaft 45R will remain stationary. Accordingly, to operate the sweeper to commence rotating the drive wheels, it will be necessary for the operator to shift the handle 34 in such a manner as to pull the cord 35 and set the brake. When the operator desires to stop the rotation of the drive wheels, he may simply release the handle 34, and the brake will release itself. To bias the brake to the releasing position, a lever 72 is attached to the shaft 38 and is resiliently pulled by a spring 73 connected to this lever and to the frame, the lever and spring being best illustrated at FIG. 8.

With the arrangement above described, the forward speed of the sweeper can be varied to suit the operator. However, the sweeper brush itself will rotate at substantially the same speed at all times.

A modified form of a linkage means for tightening the brake band about the cylinder is illustrated at FIG. 11. In this arrangement the brake band head 68' is threaded upon the rod 38. A U-shaped link 69a is mounted upon the other brake band head 68 and a lever arm 71a is affixed to the shaft 38 at each side of the head 68'. A swivel tube 74, pivotally mounted upon each arm 71a, is fitted upon the adjacent leg of the U-shaped link 69a and a nut 74a, which turns a threaded portion at the end of each link 69a, is used to adjust the position of the swivel tube 74 upon the link 69a. In this arrangement rotation of the shaft 38 will tighten the brake band about the cylinder 65, the same as heretofore described.

The sweeper hood 30 carrying this brush is formed as a pair of longitudinally disposed, parallel, generally triangular side plates 75 which are held together by a transverse tubular strut 76 at the forward point of the plates and an arcuate hood 77 extending about the upper portion of the plates. A pivot pin 78 extends laterally from each end of the strut and into a socket 79 in the adjacent arm 22 so that the entire assembly may swing upwardly and downwardly about this pivot pin to adjust the height of the brush above the ground and to make other adjustments as the brush is worn. The hood 77 commences at the forward end of the triangular plates at a location below the strut to extend thence upwardly and rearwardly as best illustrated at FIG. 5. A resilient flap 80 is attached to the lower edge of this hood to depend therefrom towards the ground surface at the same level as the sweeper brush.

The sweeper brush, illustrated in a raised position in the drawing, may be lowered to the ground surface, or at any selected elevation with respect to the ground surface whereon the wheels of the unit set, by swinging the sweeper hood about the axis formed by pivot pins 78 and a means is provided for adjustably raising and lowering the hood brush within it, as shown at FIG. 6. An elevating screw 82 upstands from one side of the frame member 20 and is secured thereto by a locking head 83 which permits it to rotate with the rotation being controlled by a handwheel 84. A guide nut 85 carried upon this elevating screw, is pivotally secured to a yoke 86 formed by a pair of spaced plates welded to and outstanding from the strut 76. Accordingly, manual rotation of the elevating screw to move the guide nut up or down will swing the yoke 86 to lower or raise the hood 30.

The shaft 32 of the cylindrical brush 31, mounted upon bearings 81 in the hood, is spaced such that rapid rotation of the brush will pick up debris, force it forwardly against the flap 80, thence up and around the hood to throw it rearwardly into the basket 33 behind the brush as indicated by the arrows at FIG. 5. The shaft 32 is operatively connected with the brush driving transmission shaft 46. One end of the shaft 32 extends through its side plate to carry a sprocket 87. The transmission shaft 46 also extends through the rib 40R to carry a similar sprocket 87 in alignment with the brush shaft sprocket and the two are interconnected by a chain 88. The sweeper hood is offset from a centered position between the arms 22 to allow a space sufficient for mounting these sprockets and the chain upon the apparatus, as best illustrated at FIG. 3, and the chain and sprocket are closed in a U-shaped housing 89 best illustrated at FIGS. 1 and 2.

The basket 33, adapted to receive debris thrown by the brush, is preferably made of canvas or similar cloth and is in a general triangular form when viewed from the side as at FIG. 1. As such, the basket consists of a pair of spaced, triangular side-walls 90, a floor section 91 and a back wall portion 92. The forward edge of this cloth floor section is sewn as a piping through which a rod 93 extends while the top edge of the back wall is also sewn as a piping with a rod 94 extending through it. The rod 93 extends from each side of this basket a distance sufficient to permit it to be placed into a socket 95 at the inner wall of each upward extension 23 of the arms 22 as illustrated at FIGS. 3 and 4, this socket 95 being arranged with a hooked portion 96 to permit the rod 93 to be snapped in position. The rod 94 at the top of the back wall of this basket is sufficiently wide as to permit it to be secured in position upon hooks 97 on the side bars 25 of the handle as illustrated at FIGS. 1 and 2. The piping at the forward end of the floor section and at the top of the backwall is interrupted at the center of this basket by a cutout to provide gripping spaces 98 so that when a basket is removed from the sweeper, the two rods 93 and 94 may be pulled together and the operator may easily grip the rods at these cutouts 98 to hold the ends of the basket together, and hold the basket in a closed position to better retain the debris in the basket until it is ready to be emptied. To permit this cloth basket to retain a desirable, triangular form when held upon the frame and handle of the sweeper, several transverse rods may be sewn into the bottom of the basket as in the manner indicated at 99.

I have now described one embodiment of my invention

I claim:

1. A wheel-mounted sweeper comprising, in combination with the body structure thereof:
   (a) an engine mounted upon the sweeper body and having a drive shaft adapted to rotate at a selected, substantially uniform rate;
   (b) a transversely disposed, rotatable sweeper brush carried upon the body at an elevation which permits the same to contact a ground surface or the like to effect a sweeping action as it rotates;
   (c) a transversely disposed, rotatable wheel shaft extending through the body and having wheels at each side of the body to support and to drive the sweeper along a selected course as the wheel shaft rotates;
   (d) a fixed speed transmission means connecting the engine shaft with the sweeper brush to rotate the sweeper brush at a fixed rate with respect to the rotation of the engine shaft;
   (e) a variable speed transmission means including a driven shaft connecting with the engine shaft, a driving shaft connected with the said wheel shaft and a differential means between the shafts adapted to be set to effect rotation of the driving shaft at a selected rate with respect to the rotation of the driven shaft; and
   (f) a control means at the differential means adapted to set the differential means to rotate the driving shaft at selectively variable rates with respect to the driven shaft.

2. In the organization set forth in claim 1, wherein said control means includes a brake means and a means adapted to actuate the brake means.

3. In the organization set forth in claim 2, wherein the driven shaft and said driving shaft are in axial alignment and said differential means is rotatably carried upon said shafts and includes a cylindrical portion having its axis congruent with the shaft axes; and
   wherein said brake means includes a band embracing said cylindrical portion and said actuating means is adapted to tighten the brake band about the cylinder with selective pressure to permit the differential to rotate at variable speeds and to remain stationary whereby to vary the rate of rotation of the driving shaft with respect to the driven shaft.

4. In the organization set forth in claims 2 and 3, wherein said brake actuating means includes a manually operated linkage adapted to tighten said brake band about the differential and a biased means adapted to release said brake band when the manually operated linkage is released by the operator.

5. In the organization set forth in claim 3, wherein the brake actuating means includes two linkage portions, a transversely disposed, rotatable shaft carrying both portions with one portion of said linkage thereon being connected to one end of the brake band and another portion of the linkage thereon being connected to the other end of the brake band, said shaft being rotatable to shift the linkage; and
   a manually operated means adapted to rotate said shaft.

6. In the organization set forth in claim 3, wherein each shaft is connected to a gear within the differential means and each gear is interconnected to the other by an idler gear carried on the differential means, whereby the driving shaft rotates oppositely to the rotation of the driven shaft when the differential is prevented from rotating, but the driving shaft does not rotate when the differential is free to rotate.

7. In the organization set forth in claim 3, wherein said engine shaft, said wheel shaft, said driven shaft and said driving shaft are arranged in spaced parallelism with the driven shaft and the driving shaft being on a common axial alignment;
   gear means in the differential means adapted to cause the driving shaft to rotate in a direction opposite to the rotation of the driven shaft when the differential unit is held against rotation and to remain stationary when the differential unit is free to rotate; and
   chain connections directly between the driving shaft and wheel shaft, the engine shaft and driven shaft and the engine shaft and aforesaid sweeper brush, whereby the wheel shaft will rotate in a direction opposite to the direction of rotation of the sweeper brush.

8. In the organization set forth in claim 7, wherein said body structure is formed as a forward and rearward portion with the engine being mounted upon the forward portion thereof with said sweeper brush being mounted at the rearward portion thereof, and with said drive shaft and transmission means being mounted within the forward portion of the unit;
   a pickup bag at the rearward portion of the unit rearwardly of the sweeper brush; and
   a hood over the sweeper brush adapted to confine debris thrown by the brush rearwardly and into the bag.

References Cited

UNITED STATES PATENTS

| | | | |
|---|---|---|---|
| 2,046,679 | 7/1936 | Furstnow | 15—83 |
| 2,194,297 | 3/1940 | Drumm | 15—83 |

EDWARD L. ROBERTS, Primary Examiner

U.S. Cl. X.R.

172—125